United States Patent [19]
Burtelson

[11] 3,808,353
[45] Apr. 30, 1974

[54] GROUNDING ARRANGEMENT FOR SPLICE CASE

[75] Inventor: Frederick W. Burtelson, Lombard, Ill.

[73] Assignee: Reliable Electric Company, Franklin Park, Ill.

[22] Filed: July 3, 1972

[21] Appl. No.: 268,446

[52] U.S. Cl.................... 174/92, 174/78, 174/88 R, 339/14 R
[51] Int. Cl............................................ H02g 15/08
[58] Field of Search...... 174/92, 93, 91, 88 R, 77 R, 174/78; 339/14 R

[56] References Cited
UNITED STATES PATENTS
3,636,240  1/1972  Quante et al. ................. 174/88 R X
3,636,241  1/1972  Baumgartner et al. ........ 174/88 R X Primary Examiner—Darrell L. Clay
Attorney, Agent, or Firm—Olson, Trexler, Wolters, Bushnell & Fosse, Ltd.

[57] ABSTRACT

A plastic case provides a housing for cable splices. The cables each have grounding shields that are interrupted within the case due to the splicing. However, a grounding harness within the case maintains shield-to-shield electrical continuity between the cables. The improved grounding harness comprises a pair of end plates secured to the interior of one of two splice case halves and joined by an insulated conductive strap that is disposed adjacent to the wall of the case. When the splice case halves are secured together, the end plates automatically engage metal sheath clamps that are in conductive connection with the grounding shields of the cables. A jumper on the strap connects to a metal valve stem projecting through the case for providing an external ground.

8 Claims, 7 Drawing Figures

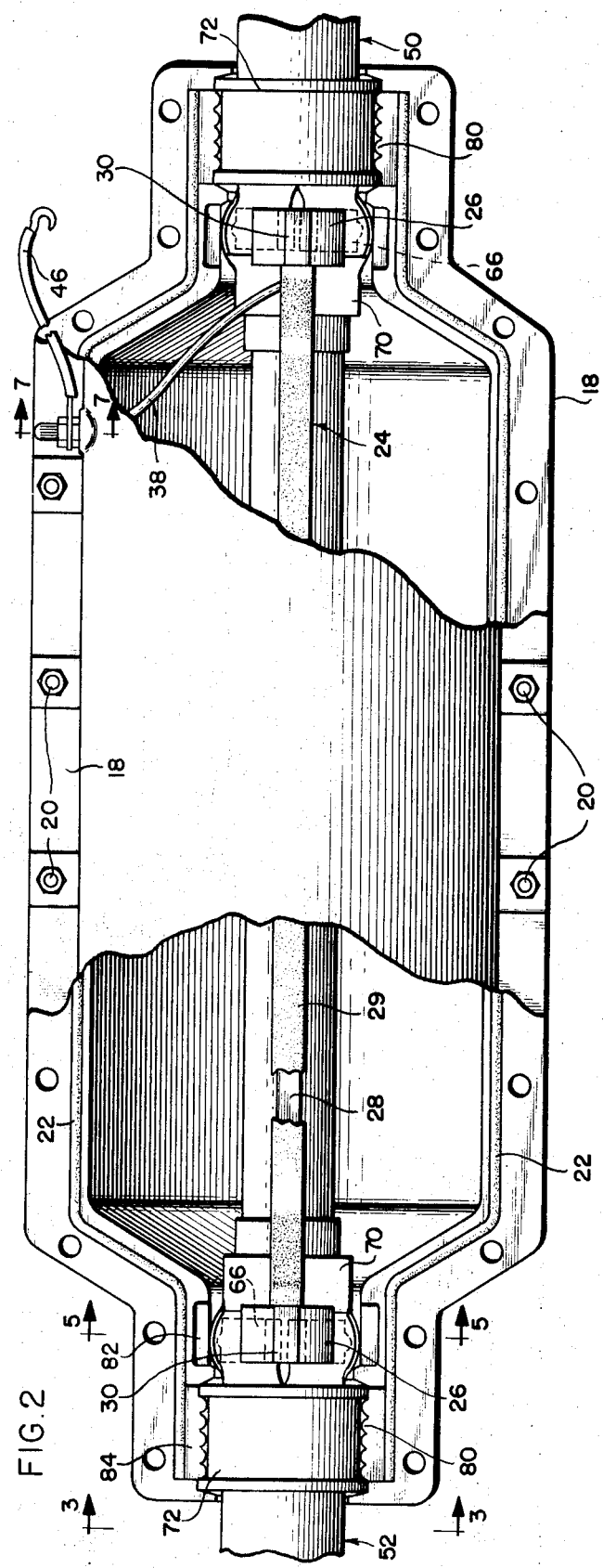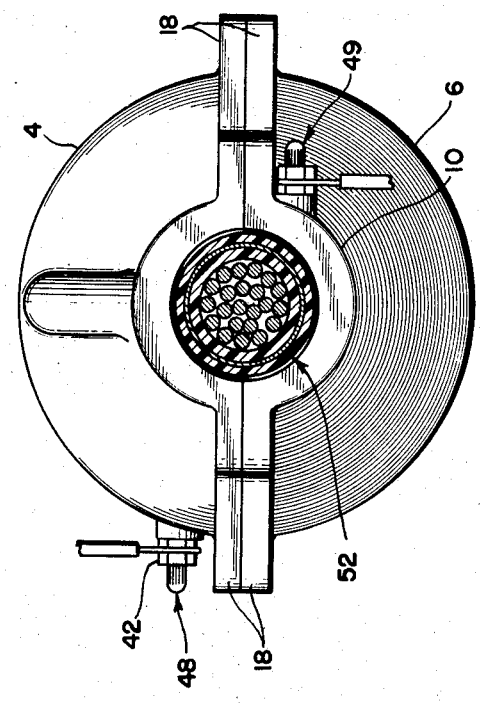
FIG. 2
FIG. 3

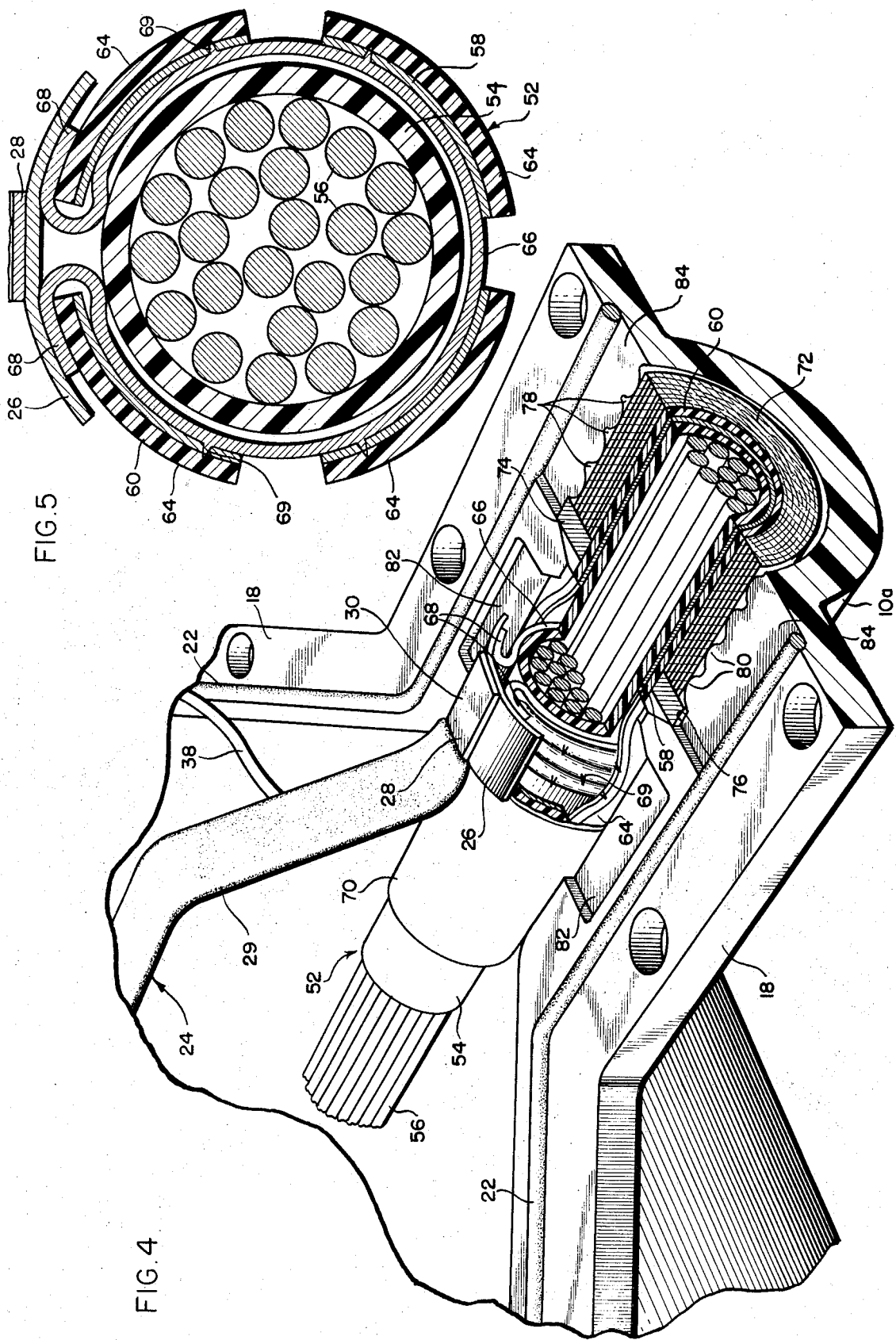

GROUNDING ARRANGEMENT FOR SPLICE CASE

BACKGROUND OF THE INVENTION

This invention relates to improvements in grounding arrangements for splice cases of the type used for telephone cables, and the like.

In splicing telephone cables in underground plastic cases, it is necessary to cut away the coverings for the core wires of the cables in order for the splicing operations to be made. Since the coverings include a metallic grounding shield, the ground of the cable within the case will be interrupted unless some provision is made for restoring it. Because the grounding shield is overlaid by an outer insulation sheath, it is usually necessary to slit the outer sheath and grounding shield in order to obtain sufficient access to the grounding shield for ground connection within the splice case. In the past, special conductive clips or connectors have been used, which are attached by field service personnel to the grounding shield of each cable entering the splice case, this being done after the outer sheath and grounding shield have been slit. These clips usually contain a binding post or like connector whereby a jumper wire can be connected to the clips to provide a continuous electrical connection between the cable grounding shields. The use of grounding arrangement of the foregoing type requires that the field service personnel make all of the hardware connections step-by-step for effecting grounding. This is not only time consuming but is something less than desired since any break in the hardware connections of the grounding arrangement can result in a loss of ground.

OBJECTS AND SUMMARY OF THE INVENTION

It is an object of the present invention to provide a splice case in which an electrical connection is established between the grounding shields of cables entering the splice case by simply securing the splice case sections together, thereby eliminating the need for field service personnel to take special steps to make ground connections internally of the splice case.

It is a further object of the present invention to provide a splice case of the type stated which includes a grounding harness that provides a ground connection externally through the wall of the splice case upon assembly of the splice case sections.

An additional object of this invention is to provide a splice case in which the entire grounding harness is integrally secured to one of the splice case sections.

A still further object of the present invention is to provide a splice case of the type stated that embodies a grounding harness of relatively simple construction.

In accordance with the foregoing objects there is provided a plastic splice case having a pair of sections which are adapted to be bolted together to form a hollow body having tubular cable entrance sections and an intermediate chamber at which the cables may be spliced. The cable entrance sections are of a smaller cross section than that of the intermediate chamber and the entrance sections and intermediate chamber are formed by cooperating semi-tubular portions of each of the case sections. Within one of the case sections is a grounding harness that extends continuously from one cable entrance section to the other. The grounding harness comprises end plates that are in mechanical and electrical connection with inner sheath clamps on the cable. A strap mechanically and electrically connects the end plates and closely follows the contour of the wall of one case section so as to maximize the amount of space available within the intermediate chamber for splicing purposes. The inner sheath clamps are mounted in mechanical and electrical contact with the respective cable shields at the cable entrance sections of the splice case whereby a continuous electrical connection is made between cable shields through the sheath clamps, the end plates and strap of the grounding harness. The grounding harness is bonded to one of the case sections by adhesive on the outer or back side of each strap end so that the grounding harness remains permanently attached to that case section. When the splice case sections are fastened together, the end plates will automatically engage the inner sheath clamps on the respective cables to provide shield-to-shield electrical continuity between cables.

Also forming part of the grounding harness is a jumper wire that extends from the strap to a metal valve that extends through the wall of the case section on which the grounding harness is mounted. An external connection from the valve stem to an external ground is, therefore, facilitated. The strap portion of the grounding harness is coated with insulation to prevent possible short-circuiting to ground of imperfect or improper splices which might accidentally have a bare wire exposed and in contact with the strap portion.

BRIEF DESCRIPTION OF THE FIGURES

FIG. 2 is a partial sectional view as seen from line 2—2 of FIG. 1;

FIG. 3 is a fragmentary sectional view taken along line 3—3 of FIG. 2;

FIG. 4 is a fragmentary perspective view, partially in section, and showing an end portion of the splice case;

FIG. 5 is a fragmentary sectional view taken along line 5—5 of FIG. 2;

DETAILED DESCRIPTION

Figure 1:
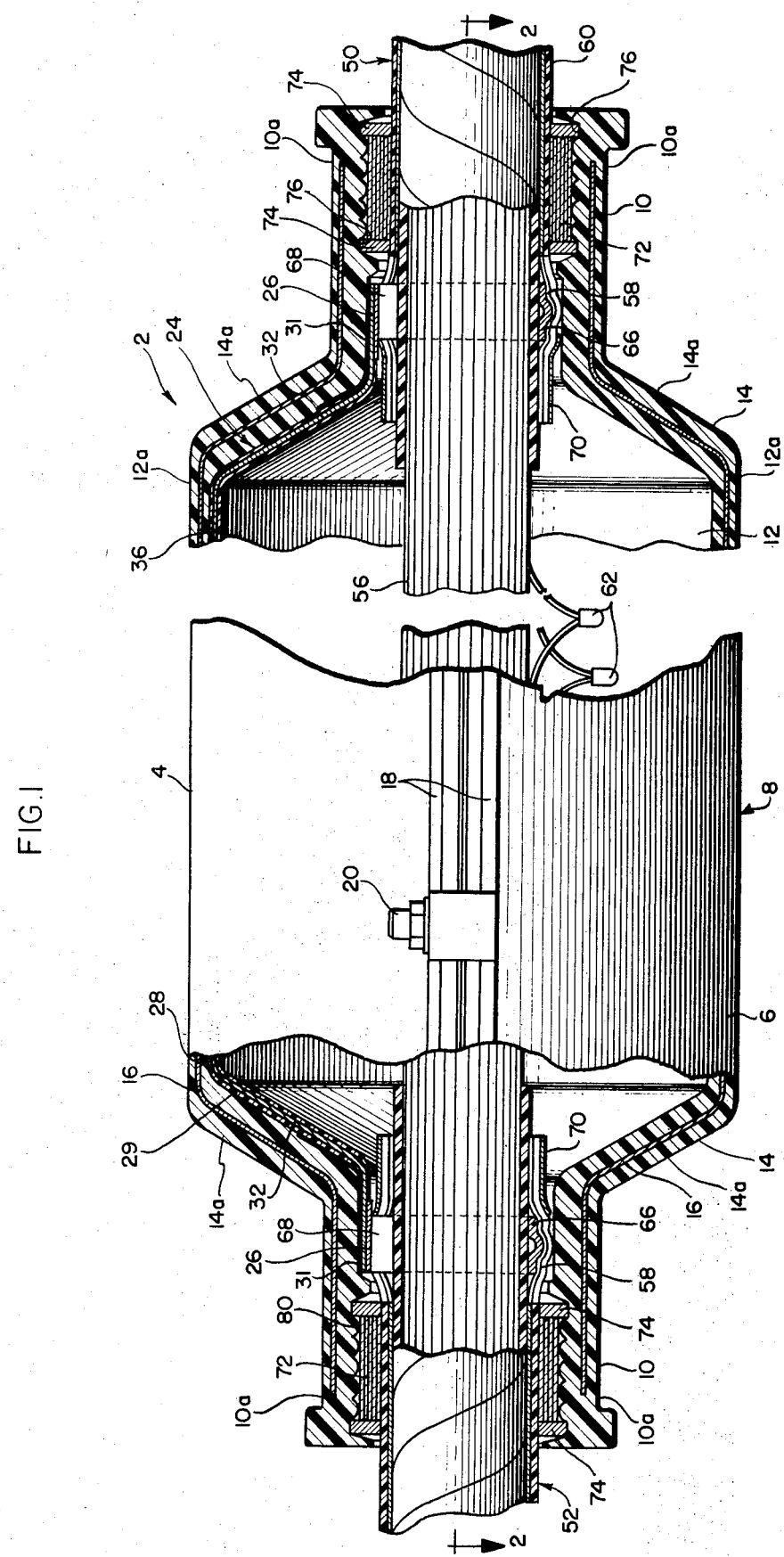
FIG. 1 is a side elevational view, partially broken away and in section, of a splice case embodying a grounding harness constructed in accordance with the present invention.
Figure 6:
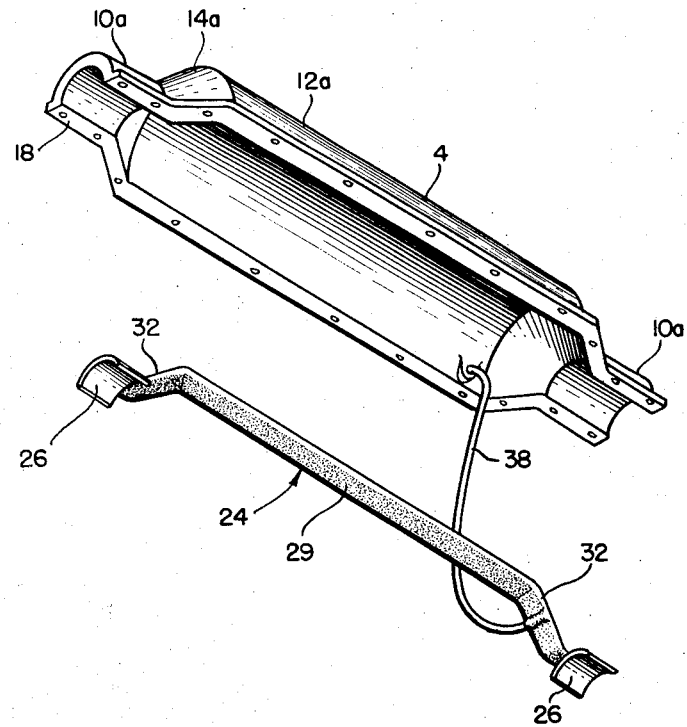
FIG. 6 is an exploded perspective view, somewhat diagramatic in form in that it omits some structural details, of one of the splice case sections and the grounding harness.
Figure 7:
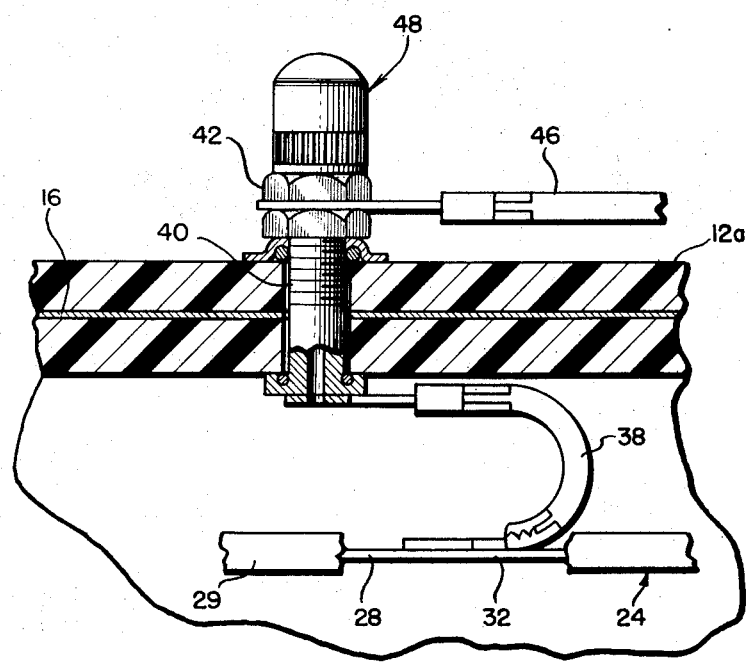
FIG. 7 is a fragmentary sectional view, on an enlarged scale, taken along line 7—7 of FIG. 2.

Referring now in more detail to the drawings, which illustrates a preferred form of the present invention, there is shown a plastic splice case 2, having cooperating halves or sections 4, 6 that are joined together to form a hollow body 8. The body 8 includes tubular entrance sections 10, 10 and an intermediate tubular splicing chamber 12 of larger diameter and having conical wall portions 14, 14, which join the cable entrance sections to the part of the splice case that forms the splicing chamber 12.

Each case half 4, 6 is of molded plastic and includes a metallic moisture barrier 16 embedded within the plastic and extending approximately the full length and width thereof. Each casing half section 4, 6 is of partial tubular cross section, more particularly of semicircular cross section but with marginal flanges 18, 18. Thus, each splice case section includes portions 10a, 12a, 14a of semicircular cross section which cooperate to define the cable entrance sections 10, 10, the conical wall portions 14, 14 and the splicing chamber 12 when the sections 4, 6 are secured together along flanges 18, 18 by a series of bolt and nut assemblies 20. At the parting or mating faces of the two case sections 4, 6, one or both of the sections may have grooves for receiving suitable sealing cords 22, 22.

Mounted within the splice case section 4 is a grounding harness 24 that includes arcuate end plates 26, 26 and an elongated strap 28 that is spot-welded to the outer surfaces of the end plates 26, 26 to provide a conductive path from one end plate to the other. The end portions of the strap 28 are bonded at their outer faces 30, 30 by a suitable adhesive 31 to each portion 10a whereby the end plates 26, 26 are disposed at the cable entrance portions 10, 10 adjacent to the conical wall portions 14, 14 and roughly concentric with the longitudinal axis or center line of the splice case 2. It will also be seen that the strap 28 is covered with a layer of insulation 29, which may be vinyl plastic, and which extends approximately the full length of the strap 28. The strap 28, furthermore, is shaped to conform to the internal wall surface of the case section 4 so as to lie substantially thereagainst. More particularly, the strap 28 includes angular portions 32, 32 that lie against opposite conical wall portions 14a, 14a of case section 4, and a central portion 36 that lies substantially against the cylindrical wall portion of section 4 that in part defines the splicing chamber 12. Thus, the strap 28 tends to take up only a minimum of space within the splicing chamber 12.

Permanently connected to the strap 28 at one of the angular portion 32 thereof is an insulated jumper wire 38. An end of the jumper wire 38 is connected to the metal valve stem 40 that projects through the wall portion 12a on the section 4. The exterior part of the valve stem 40 has a conventional nut and washer assembly 42 for securing a wire 46 that may be used for connection to an external ground. Thus, the electrical connection from the strap 28 through the wire 38 and valve stem 40 provides an arrangement for ground connection from the interior to the exterior of the splice case.

The valve stem 40 forms part of valve 48 that is like a tire valve and may be used for filing the interior of the case with grease, inert gas, or the like. A like valve 49 (FIG. 3) may also be provided on the other splice case section 6 to provide venting as material is being filled through the valve 48. In such case the valve 49 is held open for venting purposes.

The cables 50, 52 are each of a type having an inner core wrapper 54 that surrounds the pairs of insulated wires 56 of the cables. As best seen in FIGS. 4 and 5, surrounding the core wrapper 54 is a metallic grounding shield 58 that is overlaid by a plastic outer sheath 60. In preparing the cables for splicing the case sections 4, 6 are initially separated. A sufficient length of core wrapper 54, grounding shield 58 and outer sheath 60 are removed from each of the cables 50, 52 to permit exposure of core wires 56 for the formation of splices 62 (FIG. 1) in a known manner. The outer sheath 60 and grounding shield 58 for each cable is longitudinally slit in a number of places to provide a series of tabs 64. These tabs 64 are folded back so that a metallic inner sheath clamp 66 may be disposed around the inner sheath or core wrapper 54 and with ears 68 of the sheath clamp being turned over so as to lie against the outer sheath 60. In installing the sheath clamp 66, the ears 68 must be oriented so that they will be presented upwardly, as seen in FIGS. 1 and 4. This will place the ears 68, 68 in position for subsequent engagement by the end plates 26, 26. The sheath clamp 66 may include tangs 69 which bite into the grounding shield 58 so as to from good electrical contact therewith. Once the sheath clamps have been installed and the tabs 64 have been pulled forward to overlie the sheath clamp, the tabs are held in place by a wrap of vinyl or other plastic tape 70 which, however, leaves the ears 68, 68 exposed.

As respects each cable 50, 52, additional tape 72 is wrapped therearound at a region which is spaced from the sheath clamps 66 and is preferably beyond the point at which the tabs are slit. In addition, sealing washers 74, 74 are disposed around each cable and are spaced apart so as to lie in grooves 76, 76 that are formed in each of the portions 10a and which cooperate to form spaced circular grooves in the cable entrance sections 10 when the casing sections 4, 6 are assembled. Additional grooves 78 (FIG. 4) are formed axially intermediate the grooves 76, 76 and which define annular ribs 80 against which the tape 72 is pressed to facilitate, along with the sealing washers 74, a water tight seal at each cable entrance portion 10. In addition, the case sections 4, 6 may have recesses 82, 84 (FIGS. 2 and 4) at each portion 10a which may be filled with a suitable sealing material. Other arrangements known in the art may be provided for sealing the cable at the region at which it enters the splice case.

With the spliced cables in position within the case section 6, the case section 4 with its preattached grounding harness 24 may be bolted to the case section 6. When the case sections 4, 6 are brought together along their mating flanges 18, 18 the arcuate end plates 26, 26 will automatically engage the ears 68, 68 of the sheath clamps that are secured to the respective cables 50, 52. This provides a continuous electrical connection between the grounding shields of the cables 50, 52. The end plates 26, 26 are held tightly against the ears 68, 68 by a modicum of pressure resulting from tightening of the bolt and nut assemblies 20 that hold the case sections together. Consequently, ground is maintained from cable to cable even though the splice case (which is intended to be underground) may undergo some movement. External ground connection can readily be made through the wire 46.

The invention is claimed as follows:

1. A cable splice comprising plastic casing sections, means joining said sections together to form a hollow body having means forming complemental tubular entrance sections receiving cables which are spliced within said body, the cables having metallic grounding shields, said grounding shields at said entrance sections having conductive elements secured thereto and each conductive element being exposed radially of its corresponding entrance section of one casing section, a grounding harness having means forming a ground connection through said body, and a conductive portion of said grounding harness spanning the space between said conductive elements in conductive engagement therewith, said conductive portion being secured to another casing section of the splice with the ends thereof exposed radially of corresponding entrance sections of the associated casing section in juxtaposition to an adjacent conductive element and in pressured contact therewith whereby said conductive portion will automatically engage said conductive elements upon joining of the casing sections to establish conductive continuity between said metallic ground shields.

2. A cable splice according to claim 1, said conductive portion comprising a conductive strap joining said ends.

3. A cable splice according to claim 2, said ends being bonded to the interior of said one casing section.

4. A cable splice according to claim 2, said strap substantially following closely the adjacent interior contour of said one section between said entrance sections.

5. A splice according to claim 1 in which said cables each have an inner core wrapper and the grounding shield of each cable surrounds the core wrapper, and said conductive element is a clamp surrounding said core wrapper and projecting through the grounding shield and terminating in means that contact said grounding harness.

6. A case for splicing cables with grounding shields interrupted within the case, said case comprising a pair of casing sections fastened together to form a hollow body having tubular cable entrance sections and an intermediate chamber at which cables may be spliced, said entrance sections being of smaller cross section than that of said intermediate chamber and formed by cooperating partial tubular portions on each of said casing sections, a grounding harness secured within one of said casing sections and extending continuously from one partial tubular portion thereof to another partial tubular portion thereof to position the ends of the grounding harness exposed within the cable entrance sections of said one casing section for pressurized electrical contact with the grounding shields positioned within the cable entrance sections of the other casing section to establish electrical continuity therebetween, said grounding harness comprising plates at said ends within and entrance sections and a strap joining said plates and permanently connected to each, and means forming a ground connection from said grounding harness through said body.

7. A splice case according to claim 6, said strap being bonded to said partial tubular portions of said one casing section.

8. A splice case according to claim 6 having insulation covering said strap.

* * * * *